United States Patent [19]

Allocca et al.

[11] 4,138,735
[45] Feb. 6, 1979

[54] SYSTEM FOR REMOTELY RESETTING POSTAGE RATE MEMORIES

[75] Inventors: Michael A. Allocca, Fairfield; Gregory M. Cinque, Stamford, both of Conn.

[73] Assignee: Pitney-Bowes, Inc., Stamford, Conn.

[21] Appl. No.: 764,054

[22] Filed: Jan. 31, 1977

[51] Int. Cl.² .................. G06F 3/04; G06F 15/20; G01G 23/42
[52] U.S. Cl. .................. 364/900; 177/25; 364/567
[58] Field of Search ... 364/200 MS File, 900 MS File, 364/406, 567; 340/150, 148; 235/151.33; 325/26, 311; 343/175, 176; 177/25

[56] References Cited

U.S. PATENT DOCUMENTS

| | | | |
|---|---|---|---|
| 3,602,891 | 8/1977 | Clark et al. | 364/900 |
| 3,635,297 | 1/1972 | Salava | 235/151.33 X |
| 3,651,471 | 3/1972 | Haselwood et al. | 364/900 |
| 3,792,446 | 2/1974 | McFiggins et al. | 364/900 |
| 3,858,181 | 12/1974 | Goldsby et al. | 340/150 |
| 3,885,217 | 5/1975 | Cintron | 325/26 |
| 3,938,095 | 2/1976 | Check et al. | 364/900 |
| 3,944,724 | 3/1976 | Kilby et al. | 325/311 X |
| 3,978,457 | 8/1976 | Check et al. | 364/200 |

*Primary Examiner*—Mark L. Nusbaum
*Attorney, Agent, or Firm*—Peter Vrahotes; William D. Soltow, Jr.; Albert W. Scribner

[57] ABSTRACT

A system for simultaneously writing current postage rate charts into remote memories associated with a plurality of postage scale or meter microprocessors incorporates carrier wave transmission of encoded rate charts to the microprocessors. A data block, which includes an encoded receiving station address, the encoded postage rate chart, an encoded incremented rate revision designation and encoded error check characters, is transmitted. Each user's scale and/or meter includes a radio receiver, audio to digital conversion circuitry, serial to parallel conversion circuitry, and improper signal rejection circuitry. Optional direct telephone line reception is provided.

10 Claims, 3 Drawing Figures

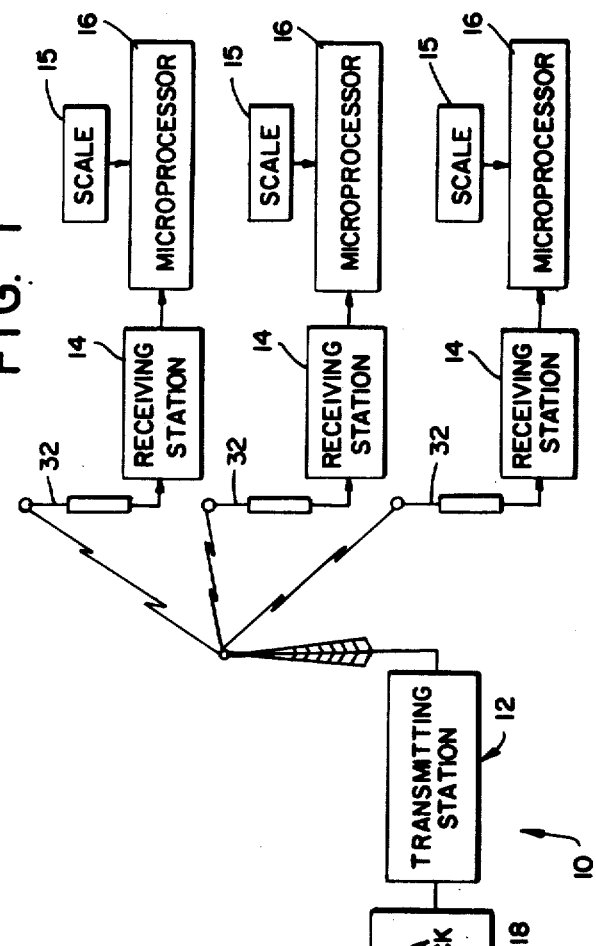
FIG. 1
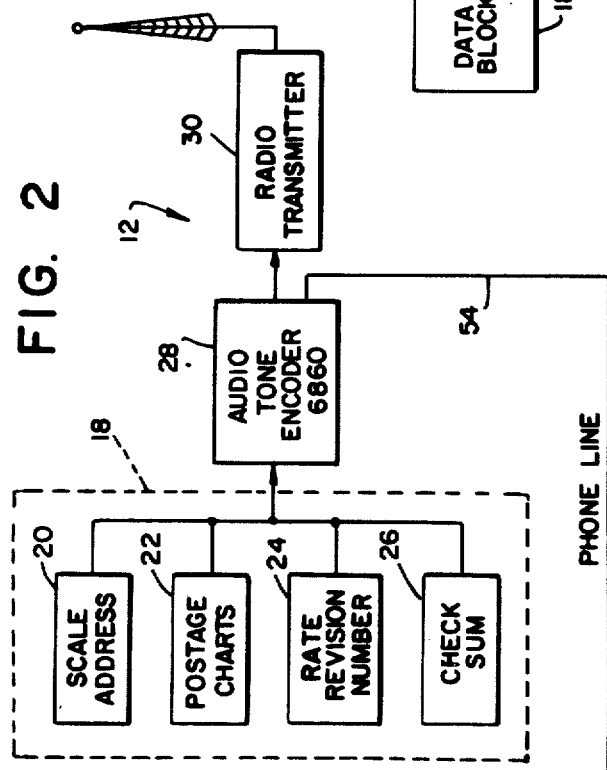
FIG. 2
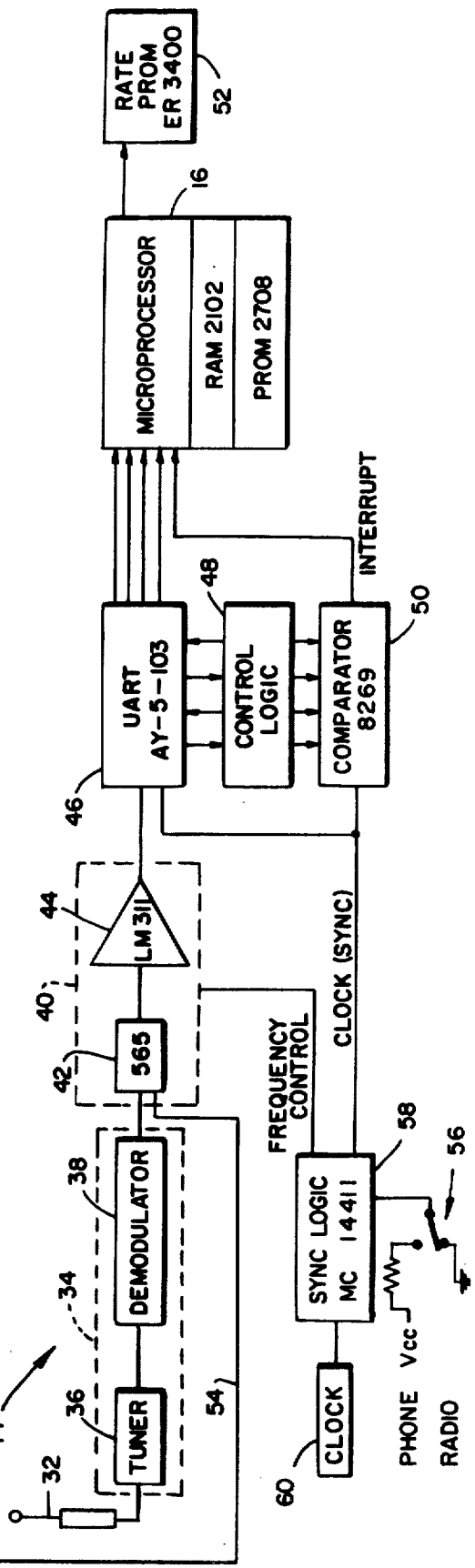

SYSTEM FOR REMOTELY RESETTING POSTAGE RATE MEMORIES

RELATED APPLICATIONS

The present invention relates to a system for updating postage rate data in memories associated with remote processing apparatus utilizing carrier wave transmissions. In copending application Ser. No. 763,998 filed simultaneously herewith and assigned to the assignee of the present invention, a system for updating postage rate information utilizing telephone transmission lines is disclosed.

BRIEF DESCRIPTION OF THE PRIOR ART

The postage scale has been one of the few articles of business equipment which did not require servicing. Minor adjustments, if at all necessary, were usually made without the necessity of calling a service technician. To date, the sole variable parameter relating to postage scale usage has been the postage rate chart or schedule used in conjunction with the scales to determine the appropriate postage.

Postage rate charts have been subject to frequent revisions and are currently revised on an average of three to five times each year. With respect to many categories of business mailings, difficulty has indeed been encountered in assuring that requisite postage has not only been determined accurately but also is in accordance with the latest postage schedules.

In U.S. Pat. No. 3,692,988, issued to Dlugos et al. on Sept. 9, 1972 and assigned to the assignee of the present invention, a microprocessor in conjunction with a scale and meter was shown. In operation, such device calculated the appropriate transporation charges for the weight of an article placed upon the scale weighing tray by reference to a transportation charge rate lookup table stored in a rate memory.

It should be appreciated that the cost of rewriting revised rate charts into a plurality of such memories situated at user's premises was understandably considered to be substantial. Even if service technicians were to go into the field and in lieu of rewriting the current charts into the existing memories in situ, replace the memories with ones having the current tables and return the old memories for recycling, the cost of such updating would be significant. These costs must necessarily be borne by the scale or meter user.

If the updated memories were capable of user substitution, the costs for timely transporation of updated memories to possibly thousands of scale and/or meter users and for return of the old memories for recycling were still significant. Such costs, when considered in conjunction with the frequent revision of rate charts by the postal service have presented a significant drawback to widespread commercial acceptability of scales having automated postage computation capabilities. Further, there was a significant possibility that the current postage charts would be incorporated in the memories either too soon before the rate revision takes effect or after such revision effective date. Accordingly, with the rate revision entered too soon, excess postage would be paid while a late entry of the charts would result in insufficient postage being applied. Thus, coordination of postage rate chart memory entries with rate revision effective dates further compounded these problems.

SUMMARY OF THE INVENTION

In compendium, the invention comprises a system for simultaneously rewriting postage lookup tables into a plurality of postage scale memories via radio transmission with each user scale including a fixed frequency radio receiver and circuitry for decoding data and rejection of spurious signals.

The receiver demodulated signal is decoded at an audio to digital conversion circuit, then converted to parallel format and grouped. A comparator interrupts the microprocessor when a transmitted address matches the scale address, and the microprocessor then verifies a transmitted rate revision number. Upon acknowledgment of the appropriate rate revision number, the microprocessor inputs the new rate charts into the memory. A final verification of a transmitted error check sum assures error free entry of the rate charts. Provision is made for optional direct telephone line transmission in lieu of carrier wave transmission.

From the above summary it can be appreciated that it is an object of the present invention to provide a system of the general character described for resetting postage rate memories which is not subject to the disadvantages aforementioned.

It is a further object of the present invention to provide a system of the general character described for resetting postage rate memories whereby a large number of remote memories may be simultaneously reset.

Another object of the present invention is to provide a system of the general character described for resetting postage rate memories which assures the coordination of postage rate revision effective dates and the entry of revised postage rate tables.

A further object of the present invention is to provide a system of the general character described for resetting postage rate memories which is both efficient and low in cost.

Yet another object of the present invention is to provide a system for resetting postage rate memories of the general character described which includes the carrier wave transmission of encoded postage rate charts to a plurality of remote postage scale memories.

A further object of the present invention is to provide a system of the general character described for resetting postage rate memories which includes a plurality of scales having radio receivers equipped to demodulate radio transmitted encoded postage rate charts.

Yet another object of the present invention is to provide a system of the general character described for resetting postage rate memories which, from the user's standpoint, is automatic.

A still further object of the present invention is to provide a system of the general character described for resetting postage rate memories which utilizes carrier wave transmission to a plurality of remote postage scales, yet provide for an optional secondary entry of current postage rates via switched telephone lines.

Another object of the present invention is to provide a system of the general character described for resetting postage rate memories which does not require the presence of a service technician at the user's premises.

Further objects of the present invention in part will be obvious and in part will be pointed out hereinafter.

With these ends in view, the invention finds embodiment in certain combinations of elements, arrangements of parts, and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention:

FIG. 1 is a block diagram illustrating a system adapted to remotely reset several postage rate memories in accordance with the present invention by carrier wave transmission of encoded data;

FIG. 2 is a schematized block diagram illustrating typical circuitry of a typical data transmitting station and a typical receiving station.

DESCRIPTION OF THE PREFERRED EMBODIMENT

Figure 3:
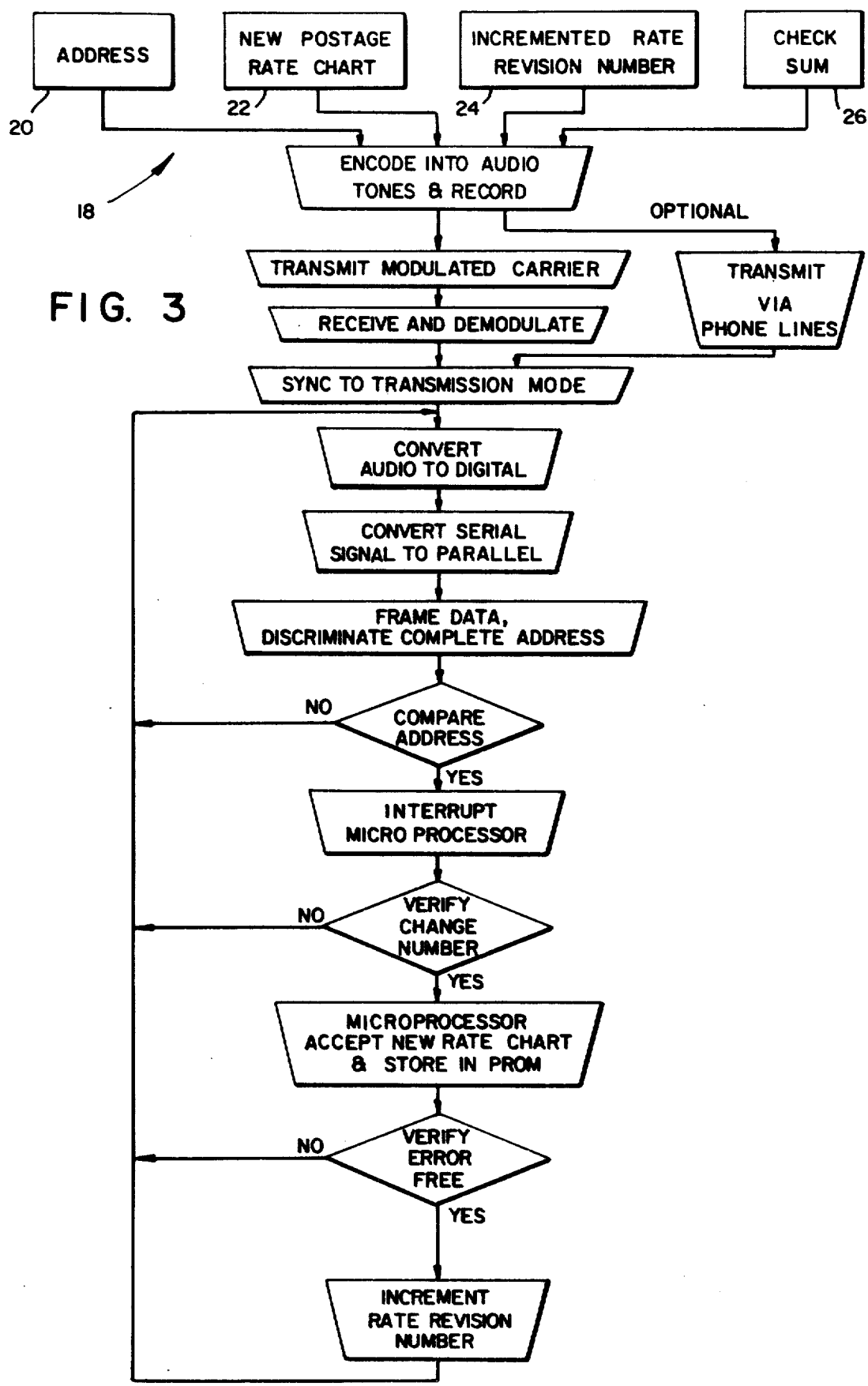
FIGS. 3 is a flow diagram illustrating the various steps for entry of revised postage charts into a plurality of remote memories in accordance with the present invention.

Referring now in detail to the drawings wherein an exemplary embodiment of the present invention is illustrated, the reference numeral 10 denotes generally a system for resetting postage rate memories comprising a signal transmitting station 12 and a plurality of remote receiving stations 14, each associated with a postage scale 15 and/or meter and a microprocessor 16 such as Intel CPU 8085, a MOS Technology 6503 and the like adapted to compute the requisite postage or other transporation charges for an article placed upon the weighing tray of the scale. It should be understood that as used herein the term "postage" is not limited to mail but is intended to include weight and/or destination distance transportation charge rates by private carriers as well.

The transmitting station 12 is adapted to transmit encoded postage rate revision tables or charts simultaneously to many remote field postage scales 15 and/or meters for revision of postage rate lookup tables stored in memories associated with the microprocessors 16 at each receiving station 14.

Postage rate charts may vary with respect to different receiving stations within a transmitting station broadcast range for numerous reasons, e.g. different zip codes for relative destination zones, different categories of mailings for which the scales and/or meters at the remote receiving stations are equipped and different parcel carriers. For this reason, as well as for the rejection of spurious signals, the transmission of new postage rate charts is accompanied by a digital scale address 20 to assure that only memories at appropriate receiving stations 14 will be revised. The entire transmission to the remote receiving stations 14 is grouped in a tone encoded data block 18 comprising the scale address 20, a revised postage rate chart 22, an incremented rate revision number 24, and a check sum or characters 26, the verification of which assures accurate transmission and receipt of the revised rate chart.

The digital data block 18, generated in serial format, is first encoded into audio tones at a tone encoder 28 such as a Motorola 6860 low speed modem and recorded. Audio tone modulated carrier wave transmission at a radio transmitter 30 permits simultaneous timely entry of the revised postage rate charts 22 into a large number of postage scales 15 and/or meter memories without any action being taken by the scale or meter user other than making certain that the line cord or other power supply for the scale 15 or meter is connected during the rate revision transmission period. As will be described hereinafter, in the event that the date block 18 is not accurately received or processed during the data block transmission cycle which is repeated over a set time period, provision is made for an optional direct telephone line retransmission of the data block.

Each receiving station 14 may be incorporated within a postage scale 15 or meter cabinet and includes a receiving antenna 32 and a radio receiver 34 comprising a fixed frequency tuner 36 set to a predetermined broadcast frequency and a carrier wave demodulator 38.

The demodulated audio tone signal is converted to a digital waveform suitable for processing and entry into a postage rate memory by an audio to digital conversion circuit 40 comprising a tone decoder 42 such as a phase locked loop, the output signal of which is suitably defined for digital processing at an analog voltage comparator 44 to provide the data block 18 as a serial digital waveform.

The data block digital waveform is thereafter converted to parallel format by a serial to parallel conversion circuit 46 which, by way of example, may comprise a universal asynchronous receiver and tuner such as a General Instruments D AY-5-1013 UART.

A logic control circuit 48 operating in conjunction with the serial to parallel conversion circuit 46 facilitates the grouping and discrimination of data words from the data block 18. The logic control circuit 48 discriminates the scale address 20 and provides an interface to transmit the discriminated scale address 20 to an address comparator 50 having a preset scale address.

A single chip multiprotocol circuit can be employed in lieu of the universal asynchronous receiver and tuner 46, the controller logic 48, and the comparator 50. A typical multiprotocol communications circuit is the Signetics Protocol Controller 2652 which, however, is a synchronous unit; and if such unit is employed, a synchronous modem such as a Motorola 6862 should be utilized rather than the asynchronous 6860.

Upon verification that the transmitted data block scale address 20 matches the preset scale address stored in the comparator 50, the comparator provides an interrupt signal to the microprocessor 16 whereupon the microprocessor initially verifies that the incoming data block includes the appropriate incremented rate revision number 24. Upon rate revision number verification, the microprocessor 16 pulls the revised postage rate chart 22 from the serial to parallel conversion circuit 46 and rewrites such chart into a postage rate memory comprising a PROM 52 which is addressed by the microprocessor 16 for access to postage rate lookup tables.

After entering the revised rate chart 22 into the PROM 52, the microprocessor performs predetermined calculations with respect to the newly entered chart to arrive at a check sum which is compared with the transmitted check sum or characters 26 and if the sums coincide, error free revision of the PROM 15 is verified and the acceptable rate revision number is incremented.

It should be appreciated that the data block 18 is cyclically retransmitted over a broadcast time or period such that in the event of signal interference noise, improper signal receipt and/or processing with a resultant rejection of the incoming data block 18, or failure to increment the rate revision number, the receiving station 14 is adapted to seek and receive subsequent retransmission of the data block. If the current chart has been entered, re-entry of the same chart is prevented since the retransmitted rate revision number will not be recognized.

The system of the present invention provides timely simultaneous transmission of data blocks 18 from one or more transmitting stations 12 to a multitude of receiving stations 14. Because each data block includes the scale address 20, several data blocks, each suitable for different receiving stations 14, may be transmitted from a single transmitting station 12 without the hazard of revising a postage rate table in a PROM 52 with rate charts not appropriate for its associated postage scale 15.

As previously mentioned, optional telephone line direct transmission of the data blocks 18 is provided. Such optional transmission mode obviates the necessity of requiring a service technician to service a scale or meter solely for the purpose of revising the postage rate memory 52. If, for example, through inadvertence the power supply of a particular receiving station 14 was not operative during the data block transmission time or radio interference inhibited complete reception, entry of the current rate chart 22 would be provided through direct interconnection. In such instances, the recorded audio tone encoded data block 18 is transmitted via a conventional telephone line 54 directly to the audio to digital conversion circuit 40.

Although the audio tone frequencies remain the same, regardless of the transmission mode, the data bit rates may vary between carrier wave and telephone line transmissions, and the receiving station is therefore provided with a transmission mode selector switch 56 operatively connected to a mode synchronization logic 58 which, by way of example only, may comprise a bit rate generator (MC 14411). The synchronization logic 58 receives a timing signal from a system clock 60 and provides a FREQUENCY CONTROL output signal coordinated with the switched data block transmission mode. The FREQUENCY CONTROL signal is available if adjustment of the frequency range of the low pass filter in the tone decoder 42 is necessary.

A further output of the synchronization logic 58 is a CLOCK (SYNC) signal used as clock input to both the serial to parallel conversion circuit 46 and the address comparator 50.

It should be appreciated that transmission of the entire data block 18 including the scale address 20 through the telephone line 54 would be preferable to provide a safeguard against inadvertent transmission of an improper rate chart to the receiving station.

Various safeguards may be provided to assure the scale and/or meter user that the latest rate revision tables are incorporated in the microprocessor calculations of transporation charges. For example, a notice may be mailed to all scale or meter users shortly before a scheduled rate revision. The mailing would indicate that the tables will be revised and that the scale and/or meter should indicate a specified postage upon placement of a control weight on the scale tray and indication of a specified zone destination. If the scale and/or meter does not indicate such postage, the user is requested to telephone the servicing company whereupon an interconnection through the telephone line 54 and transmission of the data block is provided.

Further, the microprocessor can be programmed to recognize an attempt to revise the postage rate memory and a subsequent failure to increment the rate revision number.

It should be understood that the circuitry described is merely exemplary of manifold possible variations and is by way of illustration only. For example, depending upon the quantity of data bits in the various component portions of the data block 18, additional bit capacity can be provided in the serial to parallel conversion circuit and the address comparator. Further, the microprocessor may accept the rate revision data without transposing the data stream to parallel format.

Thus, it will be seen that there is provided a system for remote resetting of postage rate memories which achieves the various objects of the present invention and which is well suited to meet the conditions of practical use.

As various changes might be made in the system as above set forth, it is to be understood that all matter herein described or shown in the accompanying drawings is to be interpreted as illustrative and not in a limiting sense.

Having thus described the invention, there is claimed as new and desired to be secured by Letters Patent:

1. A system for simultaneously revising postage rate data carried in a plurality of memories associated with a like plurality of processors adapted to calculate postage charges pursuant to a revisable postage rate structure, the system comprising means for supplying a data block, the data block including an encoded postage rate memory revision data signal, a remote location address signal and a rate revision designation signal, means for modulating a carrier wave with the data block, means for transmitting the modulated carrier wave from a first location, the memories and processors being positioned at a plurality of locations remote from the first location, carrier wave receiving means at each remote location, decoding means connected to each receiving means, the decoding means receiving the data block and in response thereto providing a corresponding data block signal, means disposed at each remote location receiving the data block signal and segregating the address signal from the postage rate data signal and the rate revision designation signal, means at each remote location receiving the address signal and comparing such address signal with a preset address signal and in response to the equality thereof providing a comparison signal, each processor receiving the comparison signal and in response thereto accepting the postage rate data signal, receiving the rate revision designation signal, said processor including means for supplying an incremented rate revision designation signal and for comparing the received designation signal with said incremented rate revision designation signal, and in response to the equality thereof entering the accepted postage rate data signal into each memory for subsequent recall during the postal calculation computations in accordance with the revised postage rate structure.

2. A system constructed in accordance with claim 1 for revising data carried in a remotely located memory associated with a processor wherein the data block further includes a digital receipt check signal, each processor receiving both the postal rate data signal and the check signal, each processor being adapted to verify the accuracy of the entry of the memory revision data with reference to the receipt check signal.

3. A system constructed in accordance with claim 1 for revising data carried in a remotely located memory associated with a processor, the system further including means for transmitting the encoded memory revision data signal over telephone lines to the remote locations.

4. A system constructed in accordance with claim 3 for revising data carried in a remotely located memory associated with a processor, wherein the telephone line transmitted data signal is transmitted at a data bit rate different from the carrier wave transmitted signal data bit rate, the system further including synchronizing means disposed at the remote location and adapted to provide a synchronization signal indicative of the data bit rate associated with each transmission mode.

5. A system for determining postage rate charges as constructed in accordance with claim 1 further including a scale at at least one of the remote locations, the scale including means providing a signal indicative of the weight of an article to be mailed, the processor at the one remote location receiving the weight signal, said processor accessing the revised postage rate data stored in the memory to determine the postage required for transportation of the article.

6. A method for updating postal rate data in a postal calculation system, the system comprising a plurality of postage meters, a like plurality of processors adapted to calculate postage charges each associated with a respective meter, and a plurality of memories each associated with a respective processor, the method comprising the steps of
   (a) modulating a carrier wave with revised postage rate data, a processor address signal and an incremented rate revision designation,
   (b) transmitting the modulated carrier wave from a first location to the plurality of processors at locations remote from the first location,
   (c) demodulating the carrier wave at each remote location to provide the revised postal rate data, a received address signal, and a received rate revision designation,
   (d) providing an independent address signal at each remote location,
   (e) comparing the received address signal with the independent address signal at each remote location,
   (f) generating a rate revision designation at each remote location,
   (g) comparing the received rate revision designation and the generated rate revision designation, and
   (h) entering the revised postal rate data in each remote memory after verifying the coincidence between the received address signal and the independent address signal, and the coincidence between the received rate revision designation and the generated rate revision designation,
   whereby the revised data may be utilized for postage calculations and setting of the respective postal meters at each remote location.

7. A method for simultaneously updating postal rate data as set forth in claim 6, the method comprising the further steps of
   (i) modulating the carrier wave with a transmission check signal,
   (j) demodulating the carrier wave to provide a received check signal at each remote location,
   (k) generating a check signal at each remote location as a function of the revised postal rate data received, and
   (l) verifying the error free receipt of the revised postal rate data after determining the coincidence between the generated check signal and the received check signal.

8. A method for simultaneously updating postal rate data as set forth in claim 7 wherein the rate revision designation for a subsequent revision is generated after verification of the error free receipt of the revised postal rate data.

9. A method for updating postal rate data in a postal calculation system, the system comprising a plurality of postage scales, a like plurality of processors adapted to calculate postage charges each associated with a respective scale, and a plurality of memories each associated with a respective processor, the method comprising the steps of
   (a) modulating a carrier wave with revised postage rate data, a processor address signal, and an incremented rate revision designation,
   (b) transmitting the modulated carrier wave from a first location to the plurality of processors at locations remote from the first location,
   (c) demodulating the carrier wave at each remote location to provide the revised postal rate data signal, a received address signal and a received rate revision designation,
   (d) providing an independent address signal at each remote location,
   (e) comparing the received address signal with the independent address signal at each remote location,
   (f) generating a rate revision designation at each remote location,
   (g) comparing the received rate revision designation and the generated rate revision designation, and
   (h) entering the revised postal rate data in each remote memory after verifying the coincidence between the received address signal and the independent address signal, and the coincidence between the received rate revision designation and the generated rate revision designation,
   whereby the revised data may be utilized for postage calculations.

10. A method for updating postal rate data in a postal calculation system, the system comprising a plurality of processors adapted to calculate postage charges and a plurality of memories each associated with a respective processor, the method comprising the steps of
   (a) modulating a carrier wave with revised postage rate data, a processor address signal, and a check signal,
   (b) transmitting the modulated carrier wave from a first location to the plurality of processors at locations remote from the first location,
   (c) demodulating the carrier wave at each remote location to provide the revised postal rate data signal, a received address signal and a received check signal,
   (d) providing an independent address signal at each remote location,
   (e) comparing the received address signal with the independent address signal at each remote location,
   (f) entering the revised postal rate data in each remote memory after verifying the coincidence between the received address signal and the independent address signal,
   (g) generating a check signal at each remote location as a function of the revised postal rate data received, and
   (h) verifying the error free receipt of the revised postal rate data after determining the coincidence between the generated check signal and the received check signal.

* * * * *